Oct. 15, 1968
H. STEMMLER
3,406,326
FREQUENCY CHANGER EMPLOYING PARALLEL CONNECTED
MAIN AND AUXILIARY GROUPS OF RECTIFIERS AND
A COMMUTATION AND QUENCHING DEVICE
CONNECTED THEREBETWEEN
Filed Oct. 6, 1966
2 Sheets-Sheet 1
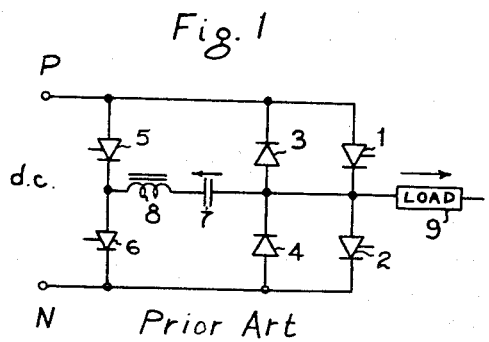
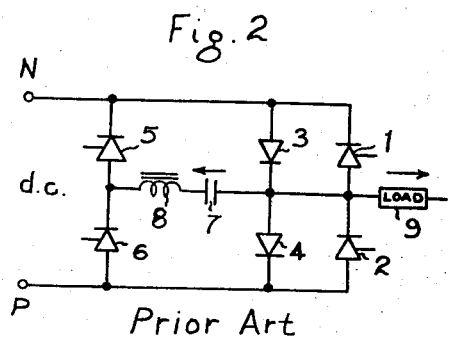
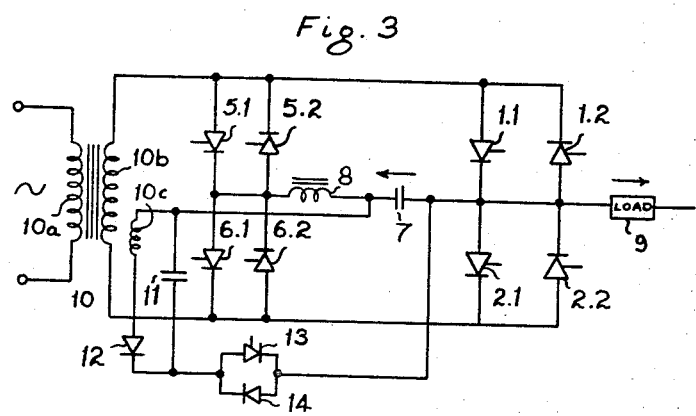
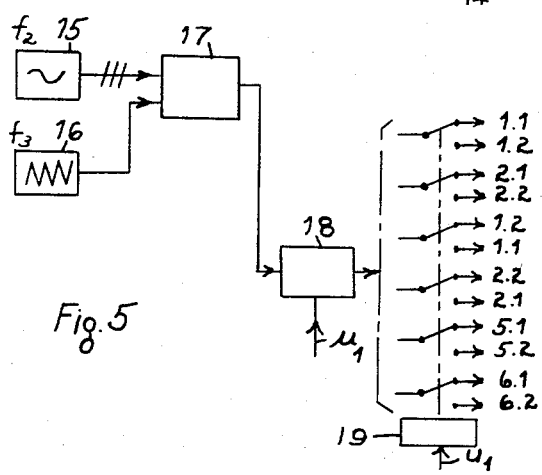
INVENTOR.
Herbert Stemmler
BY
Pierce, Scheffler & Parker
Attorneys United States Patent Office 3,406,326
Patented Oct. 15, 1968

3,406,326
FREQUENCY CHANGER EMPLOYING PARALLEL CONNECTED MAIN AND AUXILIARY GROUPS OF RECTIFIERS AND A COMMUTATION AND QUENCHING DEVICE CONNECTED THEREBETWEEN
Herbert Stemmler, Wettingen, Switzerland, assignor to Aktiengesellschaft Brown, Boveri & Cie., Baden, Switzerland, a joint-stock company
Filed Oct. 6, 1966, Ser. No. 584,827
Claims priority, application Switzerland, Oct. 8, 1965, 13,913/65
6 Claims. (Cl. 321—43)

ABSTRACT OF THE DISCLOSURE

A frequency changer of the type employing two main controllable rectifier groups arranged in series and connected to an A.C. voltage supply source, two auxiliary controllable rectifier groups arranged in series connected in parallel with the main rectifier groups and a commutation and quenching device connected between common interconnected points for the main and auxiliary rectifier groups respectively. A control device triggers the rectifier elements of the main rectifier groups at least once in each direction at different times and the rectifier elements of the auxiliary rectifier groups being triggered only during the commutation period.

---

Figure 4:
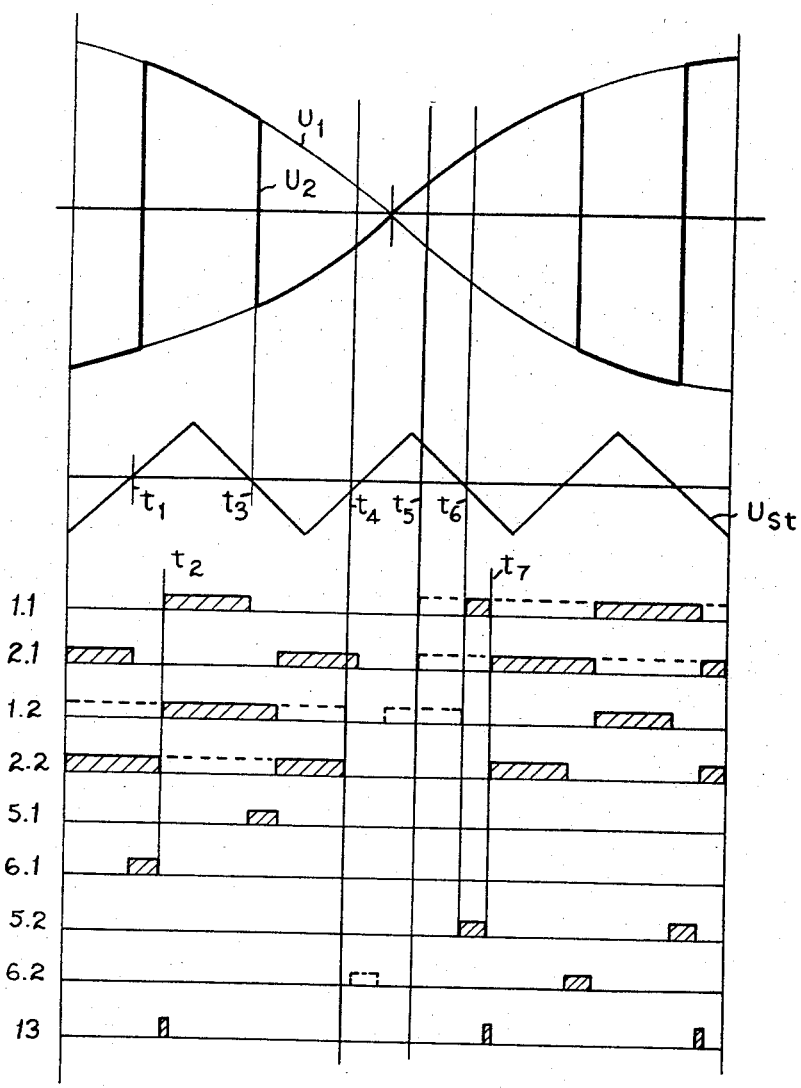

The present invention relates to a converter arrangement for the conversion of A.C. voltage sources which can be employed very advantageously in the construction of three-phase frequency converter plants, the output voltage of which can be varied within wide ranges as to frequency and amplitude, and which can be operated without a direct current intermediate or buffer circuit between the energizing and the energizer A.C. network.

Previously known frequency changers i.e. those in which the output frequency is determined by control of the rectifying elements and not by the supplied network, consist for the most part of rectifier-inverter systems with direct current intermediate circuits. A circuit of this type is shown, for example, in Brown, Boveri Mitteilungen, 1964, volume 8/9, page 555. The direct current intermediate circuit requires additional smoothing devices and makes it difficult to feed energy back into the supplying network, this only being possible by additional measures.

The object of the invention is to attain a converter arrangement whereby under a programmed control scheme one or the other pole of an A.C. voltage source can be switched to a power consumer at any time.

The employment of the converter arrangement proposed by the invention makes feasible the construction of a frequency converter plant whereby the output ends of three such converter arrays are connected to one phase each of a power consumer with Y connections, for example, a variable asynchronous machine, each to be energized by one phase of a three-phase A.C. network. The output voltage of each converter array, based on a neutral point, will in case of each alternating switching bring the value of the energizing voltage (frequency $f_1$) to its negative value and will be controlled within the frequency converter in such manner that it takes the shape of a pulse repetition with relatively great pulse frequency ($f_3$), with the keying rate being modulated by a three-phase control voltage (with the frequency $f_2$). This output voltage is thus a sinusoidal, height ($f_1$) and width ($f_2$), modulated rectangular voltage of a pulse frequency $f_3$. The Fourier analysis of these output voltages produces in addition to harmonics (frequency approximately $f_3$) the fundamental frequencies $f_1+f_2$ and $f_1-f_2$, one of which can be made inphase and will therefore not generate any current within the power consumer while the other fundamental frequency will provide the desired rotary field within the asynchronous machine.

The improved circuit arrangement in accordance with the invention is characterized in that the feeding alternating current voltage supplies two series-connected groups, consisting in each case of two anti-parallel controlled main rectifier elements, the point of interconnection of the two groups constituting an A.C. output terminal for connection to a load, and two series-connected groups each of two anti-parallel auxiliary rectifier elements connected in parallel with the first-mentioned groups, a commutation and quenching device consisting of a capacitor and choke is connected between the point of interconnection of the first mentioned groups and the point of interconnection of the auxiliary rectifier groups, and a control device for the rectifier elements during one-half wave of the supply voltage at least once triggers the rectifier elements in one direction and the opposite direction at different times and the auxiliary rectifier elements are triggered only during the commutation period, the A.C. output frequency being controlled by the control of the rectifier elements.

The invention will now be further described with reference to the accompanying drawings, in which:

FIGS. 1 and 2 show known inverter circuits;
FIG. 3 shows a circuit embodying the invention;
FIG. 4 shows the control pulses and voltages in the circuit of FIG. 3, as functions of time (abscissa), and
FIG. 5 is a schematic representation of a suitable control for the circuit of FIG. 3.

FIGURES 1 and 2 show inverters which are supplied with direct current, which could be obtained from an alternating current source via rectifiers, so that the whole circuit would then be a frequency changer with a D.C. intermediate circuit. The rectifier elements are unblocked alternately in the positive and negative directions and the duration of the unblocking impulse fluctuates in rhythm with the alternating voltage to be produced (see Brown, Boveri Mitteilungen, 1964, volume 8/9, page 556). The polarities of the D.C. voltages are opposite in the two figures. The direct current source is indicated by the plus pole P and the minus pole N. The arrows given in the drawing show the positive direction of the pertinent values. The inverters have main, controlled thyristors 1 and 2, and uncontrolled diodes 3 and 4 connected anti-parallel with these. Auxiliary controlled thyristors 5 and 6 together with a capacitor 7 and a choke 8 form a commutation and quenching circuit. The load is shown at 9. Since the supplied network is to be a three-phase network, three such arrangements are to be imagined as connected together to form one three-phase arrangement. The load 9 of these three systems would be connected in star or in delta. For simplicity, only one phase is shown. The operation is as follows: it is assumed that in the first place the thyristor 1 is triggered by a control device (not shown) and the capacitor 7 is charged in the direction of the arrow. A positive current then flows in the load 9 from P via the thyristor 1. Now the auxiliary thyristor 5 is triggered, so that the charge on capacitor 7 can reverse via the thyristor 5, the inductance 8 and the thyristor 1 as well as the diode 3, to quench the current in the thyristor 1. Simultaneously the trigger impulse at the thyristor 1 is removed, so that re-triggering is prevented. As the current, because of the load inductance, seeks to maintain itself, the load is further supplied from the capacitor 7. Since the discharge current does not have the same size as the load current, the excess current flows away via the diode 3.

When said charge reversal occurs, the right-hand side of the capacitor 7 acquires a potential that is more negative than N, so that the diode 4 can pass the load current. Upon termination of the charge reversing process, thyristor 2 receives a trigger pulse, but this has no effect so long as the current direction in the load remains positive, as initially assumed. After a period prescribed by the control device, the auxiliary thyristor 6 is triggered; the capacitor 7 again reversing the charge via the thyristor 6 and the diode 4 in preparation for the later quenching of the thyristor 1, which immediately after this charge reversal process is triggered. Hereby the current in the diode 4 is quenched, as temporarily a short-circuit occurs from P via thyristors 1 and 4 to N, and the thyristor 1 takes over the load current. Then the cycle begins again. This goes on so long as positive load current flows.

When the current in the load is negative, i.e. flows opposite to the direction of the arrow, then the process is similar. Current from the load flows into the diode 3 and the capacitor 7 reversing the charge via the control thyristor 5, the inductance 8 and diode 3, in preparation for quenching the thyristor 2, which is opened after the charge reversal of the condenser. Again there is a brief short-circuit, from P via the diode 3 and the thyristors 2 to N, so that the diode 3 is quenched.

After a period prescribed by the control device thyristor 6 is triggered and capacitor 7 reversing the charge via thyristor 6 inductance 8, thyristor 2 and diode 4 so that thyristor 2 is quenched. The load current is then again maintained by the capacitor current. The right-hand side of the capacitor 7 thereby remains positive so that the diode 3 can pass current and can therefore receive the load current. After the charge reversal process, thyristor 1 is opened, which, however, with negative load current has no effect.

In FIGURE 2 the polarity of the direct current source is reversed and the direction of conduction of the thyristors and diodes is opposite to FIGURE 1. The remainder of the circuit and the method of working are however, the same.

From this it will be seen that the same alternating voltage can be obtained by suitably arranging the directions of conduction of the diodes and thyristors, regardless of the polarity of the direct voltage.

The principle of the invention is to connect these two inverter circuits and thereby to obtain a frequency changer which can be supplied, without a direct current intermediate circuit, directly from an alternating current network exemplified by transformer 10. That part of the frequency changer corresponding to FIGURE 1 will be effective when the A.C. supply voltage has one polarity, and the part corresponding to FIGURE 2 will be effective when the A.C. supply has the opposite polarity; each of these two parts is operating as an inverter, the output frequency depending on the characteristics of the inverter, not the A.C. supply frequency. FIGURE 3 shows such a frequency changer, elements corresponding to those of FIGURES 1 and 2 being given the same reference numbers. Thyristors 1.1, 2.1, 5.1 and 6.1 correspond to thyristors 1, 2, 5 and 6 of FIGURE 1, and thyristors 1.2, 2.2, 5.2 and 6.2 correspond to thyristors 1, 2, 5 and 6 of FIGURE 2. The A.C. source is represented by transformer 10. It will be seen that the thyristors corresponding to FIGURE 1 are in anti-parallel with those corresponding to FIGURE 2.

One difference between FIGURE 3 and FIGURES 1 and 2 is that diodes cannot be used in the circuit of FIG. 3, because their periods of conductivity cannot be controlled. However, they do not need to be replaced by additional thyristors, but the main thyristors 1.1, 1.2, 2.1, 2.2 themselves can replace the diodes, because they are provided in both directions. During the positive half-wave of the voltage of the A.C. supply, the device of FIGURE 3 works in accordance with the arrangement of FIGURE 1; during the negative half-wave it works in accordance with the arrangement of FIGURE 2.

Since the half-waves are sinusoidal the same voltage is not always available for charge reversal of capacitor 7. In the vicinity of the zero passage of the A.C. voltage, capacitor 7 practically cannot charge and there is the danger that its charge will no longer be sufficient to cancel the load current and quench the conducting thyristor. As a result of this, what is called a commutation short-circuit can occur. This disadvantage can be avoided by providing a second secondary winding 10c of the transformer 10 in addition to the principal primary and secondary windings 10a, 10b which charges a capacitor 11 via a diode 12 whereby an additional charging occurs via a controlled thyristor 13 with anti-parallel connected diode 14. The thyristor 13 receives trigger impulses after each charge reversal process i.e. after the impulse for the auxiliary thyristors concerned. Thus, the commutation circuit is stabilized.

In order to avoid commutation short-circuit on change of sign of the supply voltage it is further necessary after the zero passage of the supply voltage for the first auxiliary thyristor impulse and the subsequent main thyristor impulse to be suppressed. Accordingly, after the zero passage, a to-and-fro switching is emitted. This is of no importance as the voltage to be switched is practically zero.

The control of the converter arrangement as shown by FIGURE 3 is accomplished by means of a controlling device, illustrated in FIGURE 5 in the form of a block schematic diagram. In that device a first control signal generator 15 produces a three-phase control voltage which is variable as to amplitude and frequency ($f_2$). A second control signal generator 16 furnishes a triangular voltage with the frequency $f_3$. These control voltages are correlated in the control unit 17, and for each phase of the three-phase control voltage there will be generated the difference relative to the triangular voltage. At each crossover of this difference voltage a pulse combination will be triggered and conducted to the thyristors as the gate pulses. These pulse combinations are depicted in FIGURE 4 wherein the times are plotted at which the thyristors are receiving trigger impulses, i.e. are opened. These times are indicated by the shaded areas in the ten horizontal ranks of FIGURE 4 identified with the reference numbers of the corresponding thyristors.

Above the thyristor pulses the triangular difference voltage $U_{st}$ is plotted. At each passage of this difference voltage through zero, impulses are passed to the thyristors. Above the difference voltage are plotted the sinusoidal supply voltage $U_1$ and the output sinusoidal voltage $U_2$. The several thyristor pulse plots have been given the same reference numerals as their respective thyristors depicted in FIGURE 3. The different impulse width necessary to produce an alternating voltage is not given in FIGURE 4.

The operation described begins at the time when $U_1$ is positive and thyristor 2.1 has just opened. The current in the load then flows from right to left. At the time $t_1$ the control voltage $U_{st}$ goes through zero. At this moment the trigger impulse at the gate of the thyristor 2.1 ceases and control thyristor 6.1 receives an impulse, as a result of which current can flow through this thyristor. The said current passes from the capacitor 8 and makes a complete circuit via the thyristor 2.1 in the opposite direction to the load current, so that thyristor 2.1 now becomes currentless. A short time later, at time $t_2$, thyristor 1.1 receives an impulse. This is produced at time $t_1$ but, because of a time delaying device, does not come into effect until time $t_2$. Now thyristor 1.1 is rendered conductive and current flows again via the thyristor 1.2. During this period, a voltage is fed to the supplied network, the curve of which is a positive part of the voltage curve $U_1$. Then the same cycle takes place again with the thyristors 5.1 and 2.1, the direction of the voltage again reversing. Now the operation has reached the vicinity of zero passage of the primary voltage $U_1$.

After the feed voltage $U_1$ passes through its zero point, the thyristors with the index 2 (thus 1.2, 2.2) are used for the control. For this purpose for the following impulse the impulse paths are shifted from the thyristors 6.1, 6.2 and from 5.1, 5.2 and from the respective main thyristors 1.1, 1.2 and 2.1, 2.2 with the help of the switching device 19, answering at the time point $t_4$, when the feed voltage $U_1$ reaches a certain threshold value. After the shifting of the impulse, the first impulse for the auxiliary thyristor 6.2 and main thyristor 1.2 must be suppressed. This is accomplished with the assistance of the discriminator circuit 18, shown on FIGURE 5.

Thyristor 5.2 receives the next impulse at time $t_6$ and a little later at time $t_7$, the thyristor 2.2. The method of operation is the same as with the first half wave of the feed voltage $U_1$.

The thyristors arranged in contrary direction to the voltage of the supply network, i.e., 1.2 and 2.2, should act, in the range to the left of zero passage, like the diodes in FIGURE 1. They could accordingly remain open during a whole half-wave. This is shown by the dotted line at 1.2 and 2.2, and correspondingly to the right of zero passage for 1.1 and 2.1. It is accordingly possible to proceed in such a way that the controlled rectifier lying in the counter direction to the voltage of the A.C. supply network receives impulses only while the associated rectifier elements lying in the direction of the voltage of the supply network are open, multiplied by the time in which the subsequent auxiliary rectifier is opened. FIGURE 4 shows in addition the impulses for the thyristor 13 to stabilize the charging of the capacitor 7 as already described. These impulses only occur when the capacitor is charged in the direction of the arrow (FIGURE 3) and this is the case at the times $t_2$ and $t_7$.

I claim:

1. In a self-guided externally controlled frequency changer adapted to be supplied by an A.C. voltage source, the combination comprising two series-connected main rectifier groups connected to said A.C. voltage source, each said group comprising two anti-parallel connected controlled main rectifier elements, the common points of interconnection between said main rectifier groups constituting an A.C. lead out terminal for connection to a load, two series-connected auxiliary rectifier groups each of which comprises two anti-parallel connected auxiliary controlled rectifier elements connected in parallel with said main rectifier groups, a commutation and quenching device comprising a series connected choke and capacitor connected between said common interconnecting points for said two main rectifier groups and the common interconnecting points for said two auxiliary rectifier groups, and a control device controlling said rectifier elements during one half-wave of the A.C. supply voltage source, said control device being arranged to trigger said main rectifier elements at least once in each direction at different times and the said auxiliary rectifier elements being triggered only during the commutation period, the A.C. output frequency being controlled by said control device for said rectifier elements.

2. A frequency changer as defined in claim 1 wherein an additional controlled rectifier element is provided for improving the charging of said capacitor element of said commutation and quenching device, said additional rectifier element being fed from said A.C. voltage source and connected to said commutation capacitor and including another capacitor in circuit therewith for establishing a constant D.C. voltage.

3. A frequency changer as defined in claim 1 and which further includes a switching device controlled by said A.C. voltage source which in the region about the zero passthrough point of said A.C. voltage source suppresses the impulses of said main rectifier element lying in the direction counter to said source voltage, and a discriminator circuit by means of which said first auxiliary rectifier element impulse and the subsequent corresponding main rectifier element impulse are suppressed.

4. A frequency change as defined in claim 1 wherein said control device functions to release said controlled main rectifier elements lying in a direction counter to said source voltage continuously during a half-wave with the exception of a region of about the zero pass-through point of said source voltage.

5. A frequency changer as defined in claim 1 wherein said control device functions to supply triggering impulses to said controlled main rectifier elements lying in a direction counter to said source voltage so long as the corresponding rectifier elements lying in the direction of said source voltage are open together with the time in which the subsequent auxiliary rectifier element lying in the same direction is open.

6. A frequency changer as defined in claim 1 wherein said controlled rectifier elements are thyristors.

References Cited

UNITED STATES PATENTS

| 3,207,974 | 9/1965 | McMurray | 321—45 |
| 3,337,788 | 8/1967 | Pelly | 321—7 |
| 3,354,370 | 11/1967 | Corry et al. | 321—45 |

LEE T. HIX, *Primary Examiner.*

G. GOLDBERG, *Assistant Examiner.*